United States Patent
Cumpson et al.

(10) Patent No.: US 8,069,283 B2
(45) Date of Patent: Nov. 29, 2011

(54) METHOD OF PROCESSING AND PRIORITIZING AT LEAST ONE LOGICAL DATA STREAM FOR TRANSMISSION OVER AT LEAST ONE PHYSICAL DATA STREAM

(75) Inventors: Stephen Rodney Cumpson, Eindhoven (NL); Ozcan Mesut, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1364 days.

(21) Appl. No.: 10/513,940

(22) PCT Filed: Apr. 22, 2003

(86) PCT No.: PCT/IB03/01549
§ 371 (c)(1),
(2), (4) Date: Nov. 9, 2004

(87) PCT Pub. No.: WO03/096676
PCT Pub. Date: Nov. 20, 2003

(65) Prior Publication Data
US 2005/0204076 A1      Sep. 15, 2005

(30) Foreign Application Priority Data
May 14, 2002   (EP) .................................... 02076900

(51) Int. Cl.
*G06F 3/00*      (2006.01)
(52) U.S. Cl. ............... 710/41; 710/3; 710/114; 710/116
(58) Field of Classification Search ............. 710/5, 6, 710/58, 40, 41, 42, 114, 116
See application file for complete search history.

(56) References Cited

U.S. PATENT DOCUMENTS

| | | | | |
|---|---|---|---|---|
| 5,506,969 A * | 4/1996 | Wall et al. | ...................... | 710/107 |
| 5,870,599 A | 2/1999 | Hinton et al. | .................. | 395/586 |
| 5,875,464 A | 2/1999 | Kirk | .............................. | 711/129 |
| 6,466,982 B1 * | 10/2002 | Ruberg | ......................... | 709/227 |
| 6,650,645 B2 * | 11/2003 | Scott et al. | ............... | 370/395.71 |
| 6,956,818 B1 * | 10/2005 | Thodiyil | ....................... | 370/230 |
| 2002/0120733 A1 * | 8/2002 | Kring | ............................ | 709/223 |

FOREIGN PATENT DOCUMENTS

| | | |
|---|---|---|
| EP | 1119197 | 7/2001 |
| WO | WO 0040007 A | 7/2000 |
| WO | 0062547 A1 | 10/2000 |

OTHER PUBLICATIONS

T13/D99128 revision 10" as available under http://www.t13.org.

* cited by examiner

*Primary Examiner* — Eron J Sorrell

(57) ABSTRACT

Method of processing data of at lease one data stream, data processing module for processing at a of at least one data stream, data processing system comprising such module, computer program product, data storage system and method of use thereof. For a time-based transfer of data to or from a device, data streams may be given a system ID and it is proposed to dynamically distribute available stream IDs. The proposed concept provides for indicating a type of data stream, providing and/or handling a set of stream IDs comprising a number of stream IDs and issuing a stream ID from the set of stream IDs to the data stream depending on the type of data stream. In a preferred embodiment, it is proposed to reserve one stream ID for an audio-video request, characterized by having no error handling time available. A further stream ID may be reserved for best effort requests. Still further streams IDs may not be reserved but are freely available for pending error handling procedures, such as time-sliced error handling procedures.

20 Claims, 2 Drawing Sheets

Figure 1:
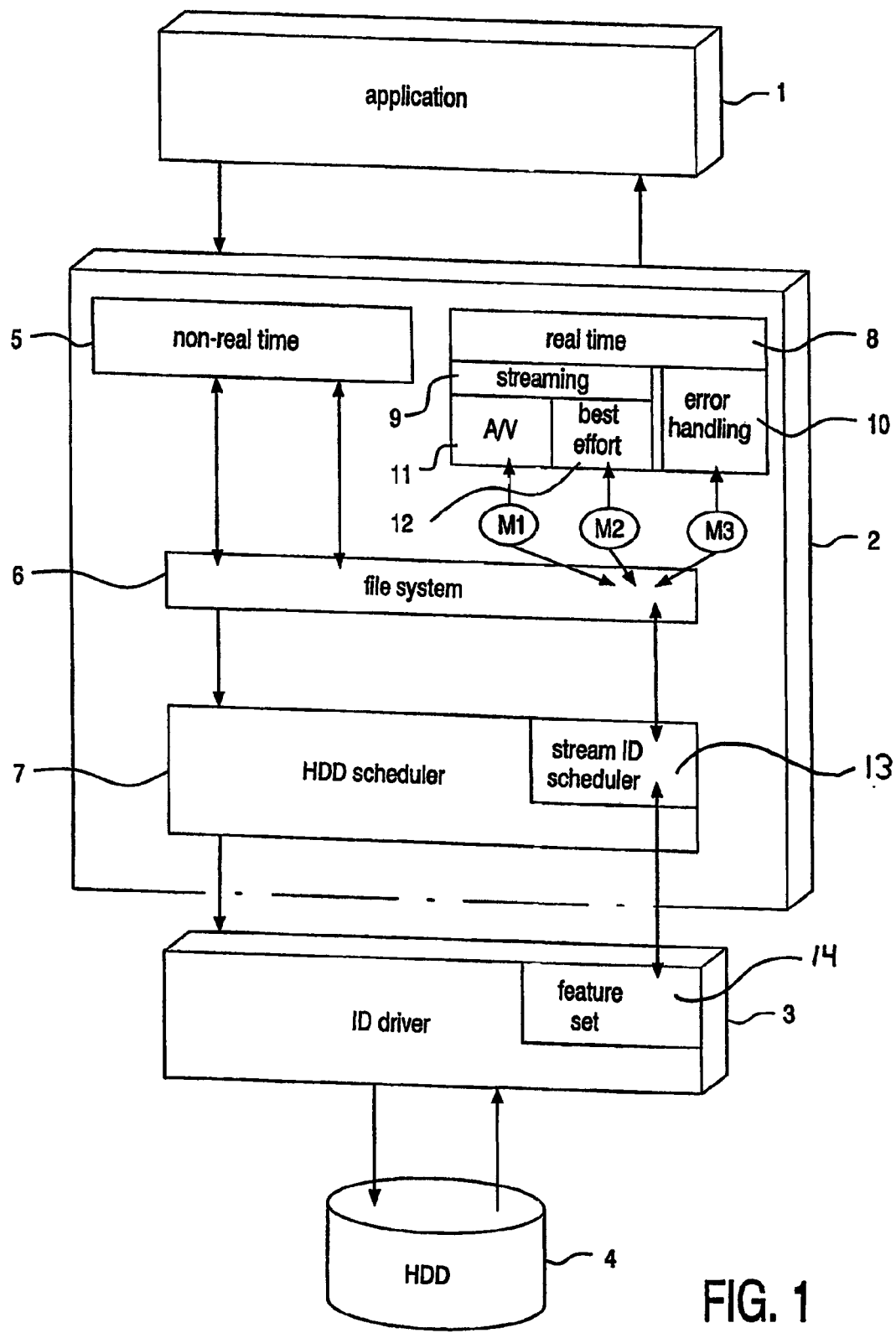

| ID | ID Mark | ID valid | ID busy | PID |
|---|---|---|---|---|
| 0 | A / V | x | x | 🖥 |
| 1 | best effort | x | x | 🖥 |
| 2 | | | x | |
| 3 | | x | x | - |
| 4 | | | x | |
| 5 | | x | x | - |
| 6 | | | x | |
| 7 | | x | x | - |
| 8 | | | x | |
| 9 | | x | x | - |
| 10 | | x | x | - |
| 11 | | x | x | - |

FIG. 2

METHOD OF PROCESSING AND PRIORITIZING AT LEAST ONE LOGICAL DATA STREAM FOR TRANSMISSION OVER AT LEAST ONE PHYSICAL DATA STREAM

The invention relates to a method of processing data of at least one data stream. Further, the invention relates to a data processing module for processing data of at least one data stream and a data processing system comprising such a module. Also the invention relates to a computer program product storable on a medium readable by a computer system, a data storage system and a method of use thereof.

Conventional data processing systems are constructed to aim for maximum data integrity, e.g. by delaying the completion of a command until properly executed. The layout of data, a host, periphery devices and file systems are adapted to such a concept. In particular, traditional data-orientated data processing systems have no real-time requirements and the outlined approach of aiming for maximum data integrity may be properly applied for a traditional type of data such as IT-data, which will be defined further down. IT refers to information technology. However it is not suitable for streaming of data like audio-video data. Such kind of data demand for high processing performance and effectiveness. Stream data such as audio-video data are to be processed within certain time limits. A processing schedule is known from e.g. EP 1 119 197 A2.

Within recent years commonly used techniques for processing data streams have been established. Currently and step by step, standards are being defined that will incorporate such techniques e.g. specifications of communication between host system and a storage device. Such a standard, which is also known as the ATA-standard (AT Attachment Interface) provides a common attachment interface for system manufacturers, system integrators, software suppliers and suppliers of intelligent storage devices with regard to data streaming and real-time requirements. In particular, the ATA standard includes a packet command feature set implemented by devices commonly known as ATAPI devices. Such a standard advantageously maintains a high degree of compatibility while providing additional functions without requiring changes to presently installed devices or existing software. In order to provide a better framework or to improve the operation of audio-video devices on the ATA bus, a module under which such devices are expected to operate is defined within a common framework. In particular, a major item is the handling of stream data and sequential transfer of data.

A stream is the time-based transfer of data to or from a device. Stream data is defined as time-critical data unlike the definition of IT data. The term IT data is used to refer to traditional quality of a data delivery method. In particular, IT data are defined as reliability-critical data. A device should not return errors to the host on IT data transfer commands until all possible data recovery procedures have been attempted.

Data streaming has to fulfill a variety of different requirements. A stream is composed of one or more allocation units. The minimum logically contiguous group of a storage medium is an allocation unit. An allocation unit is accessed with one or more requests. An allocation unit itself consists of transfers that are the length of a request size. All logical block addresses associated with the single allocation unit are logically contiguous. The number of logical block addresses in the requests and allocation units are particularly important in order to maintain the stream data rate. The request size must be chosen to permit the seek and rotational latency of a storage medium to occur between each allocation unit without affecting the stream transfer rate requirements.

Within such a concept, stream data and in particular audio-video data have a time-based orientation. Audio-video data (AV-data) should be delivered within certain time constraints or it becomes valueless. For example, late delivery of data for a new video frame during a movie playback will cause visible artifacts such as skipping, audio noise or video frame corruption. This time-orientation differs from non-streaming hard drive applications where data delivery of e.g. IT data may be delayed without visible results. In typical hard drive applications the quality of data is of paramount importance rather than the time of delivery. Therefore, sophisticated error recovery algorithms implemented in non-streaming application drives may provide means for ensuring the quality of the data. While the quality of audio-video data is not insignificant, it is of secondary importance to the time of data delivery.

In summary, and as a rule of thumb, good audio-video data delivered too late is generally equal in relevance to poor data delivered on time. The goal of the audio-video capability for a hard drive is to provide timely delivery in the best possible quality data.

AV data are known as audio-video data. In particular audio-video applications utilize data that are related to video images and/or audio. The distinguishing characteristic of this type of data is that accuracy is of a lower priority than timely transfer of the data.

An AV-data stream may be delivered in sequential order or interleaved or unaligned, even with the inclusion of non-AV data dependent on the specific application. A delivery interval is defined as the period of time in which an allocation unit must be delivered in order to support playback or recording of a stream as a required data transfer rate.

It is nowadays intended to provide a streaming feature set within the above-mentioned ATA standard. The streaming feature set is an optional feature set that allows the host to request delivery of data from a contiguous logical block address range within an allotted time, the priority being placed on the time taken to access the data rather than on the integrity of the data. A device implementing a streaming feature set should implement a minimum number of streaming commands. The streaming commands are defined to be time-critical data transfer commands rather than the standard data integrity critical commands. Each command should be completed within the time specified in a configuration of the stream settings or in the streaming command itself in order to ensure the stream requirements of the AV type application. The particular device may execute a background task as long as the streaming command execution time limits are still met.

E.g. for such purpose it is intended to provide numeric stream identifiers known as stream IDs. Such stream IDs may be provided by a host. Such stream IDs may in particular be used by the device to configure its resources to support the streaming requirements of the AV content. Further information may be taken from: "Working draft T131410D—Information Technology—AT attachment with packet interface-6 (ATA/ATAPI-6)—edited by Peter T. McLean, T13—Dec. 14, 2001" and "T13/D99128 revision 10."

The quoted T13 standard limits the number of stream IDs, which will be referred to as physical stream IDs where necessary. In particular, there are only eight possible physical stream IDs available as yet. The current ATA standard does not take into account the possibility that many streams could be used and, as such, has a serious limitation. In a smart host system model, the stream ID is of little importance except when errors occur. The stream ID then takes on a role of what could better be described as an error ID. The hard disk drive uses the stream ID to remember the last error reported for each stream ID and, more importantly, how much of the error recovery procedure has been completed in handling the last error reported for each stream ID. This cumulative approach has been termed "time-sliced error handling" and the procedure allows a host to achieve PC data reliability but in a schedulable manner. The limitation of stream IDs contains an implication per se that a system will run out of stream IDs, blocking all other data processing when handling more errors than the limit number of stream IDs, e.g. eight. Still more importantly such a concept is restricted to error handling. However, error handling per se contradicts the concept of handling streaming data, such as AV data, which at best are processed without any error handling time or other delay. Therefore, the present concept of stream IDs is not sufficient to be applied to AV applications. In particular, a server system serving multiple customers with audio-video streaming applications is not expected to work within time restriction demands with the ID stream restrictions of the present concept.

It is known to provide renaming of streaming buffers for memory accesses issued by a microprocessor to an external memory via a system bus. This allows up to a number of N such memory accesses at any one time for a number of M physical streaming buffer locations, where N is greater than M. However such concept is directed to a completely different topic and restricted to processor internal caching. Such a concept applies to caching of data, wherein it is possible for a host to indicate, on a per-command basis, whether a device should perform caching or continue pre-fetching sequential data. Caching of data allows a device to indicate to a host that a data process has been completed before the host data has actually been committed to the media. In particular, regarding U.S. Pat. No. 5,870,599, when a fetch within the processor misses the instruction cache, the fetch address is placed in the streaming buffer. When the data has been fetched from the external memory, it is returned to the streaming buffer and placed into one of the M physical buffer locations. In particular, in a preferred embodiment of U.S. Pat. No. 5,870,599, streaming buffer renaming allows up to four instruction fetch unit fetches to be outstanding at any one time, even though only two physical streaming buffers are currently employed. Still the outlined teaching of U.S. Pat. No. 5,870,599 is restricted to command and data processing in a microprocessor and the caching thereof. Restrictive requirements with regard to real-time data processing are ignored. Prior art data processing is performed irrespectively of the type of data to be processed. Further prior art data processing does not consider real-time data processing requirements as outlined above. Such concept is not applicable with regard to data streaming.

All concepts known from prior art still handle data streams irrespectively of the type of data streams. The ATA standard will incorporate a feature set for AV streaming applications. Within the feature set of the ATA standard, individual data streams may be given a stream ID. In all known concepts such stream IDs are more or less used as error IDs. Such IDs are used, for instance, within time-sliced error management concepts. Also only a limited and small number of stream IDs is available, in particular only eight stream IDs. A problem arises with more than eight streams, for server serving multiple displays or error handling procedures exceeding the number of eight for instance. When the system is out of stream IDs, other data will be blocked and will cause severe degradation of processing performance. Therefore concepts known from prior art are not applicable to streaming of data with regard to real-time data processing requirements.

This is where the invention comes in, the object of which is to specify a method of processing data of at least one data stream and suitable apparatus means for processing data of at least one data stream and a use thereof which allows a handling of a data stream with regard to real-time data processing requirements and increased flexibility of handling of such stream data, even if only a limited number of stream IDs is available, i.e. handling of stream data independent of a limited number of stream IDs. More specifically such method and apparatus means should be designed to be able to perform data processing of stream data and/or of audio/video data and/or handling thereof on a disk drive medium.

Concerning the method, the object is solved by a method of processing data of at least one data stream, wherein in accordance with the invention the method comprises the steps of:
  indicating a type of data stream with regard to requirements at real-time data processing,
  providing and/or handling a set of stream IDs comprising a number of logical stream IDs, wherein a logical stream ID is assignable to a physical stream ID and wherein the number of logical stream IDs of the set exceeds or is equal to a number of physical stream IDs,
  issuing a logical stream ID to the data stream dependent on the type of data stream.

Concerning the apparatus, the object is solved by a data processing module for processing data of at least one data stream, wherein in accordance with the invention the module has a software layer in which a scheduler means is provided for:
  receiving an indication of the type of data stream with regard to real-time data processing requirements,
  handling a set of stream IDs comprising a number of logical stream IDs, wherein a logical stream ID is assignable to a physical stream ID and wherein the number of logical stream IDs exceeds or is equal to a number of physical stream IDs,
  issuing a logical stream ID from the set of stream IDs to the data stream dependent on the type of data stream.

The term physical stream ID refers to a stream ID, which is physically available within contemporary standard limits. The number of physical stream IDs therefore corresponds to the number of valid stream IDs.

The term logical stream ID refers to the stream IDs of the set. The stream IDs of the set can be assigned to a physical stream ID. Therefore, each time a logical stream ID of the set is assigned to a physically available stream ID this particular logical stream ID corresponds to a particular physical stream ID. There is no fixed schedule for such an assignment and a logical stream ID may be assigned to any one of the physically available stream IDs. In particular, in the case when the number of logical stream IDs of the set exceeds the number of physical stream IDs, not all of the logical stream IDs can be assigned to a physical stream ID. In this case some of the logical stream IDs cannot be assigned to a physical stream ID. The latter unassignable logical stream IDs correspond to virtual stream IDs which, in fact, are physically not available. Nevertheless, all of the logical stream IDs can be used for issuing to a data stream. This thereby guarantees that a logical stream ID, whether corresponding to a physical stream ID or a virtual stream ID, is available to be issued to a data stream in any case, thus preventing an interrupt or skipping of data. In contrast a prior art system runs out of stream IDs, as only a limited number of physical stream IDs are available. Real-time processing is guaranteed only with the proposed concept.

Further, the proposed invention has arisen from the desire to dynamically issue stream IDs at a suitable software layer close to a device layer and also to guarantee real-time processing of stream data. In particular, it was realized by the invention, that a general uniform treatment of stream data independent of the type of data is not sufficient to provide reliable data processing of stream data, and in particular audio/video data, with regard to time restriction requirements of audio/video applications. Therefore, the main perception of the proposed invention is to provide a concept, which issues stream IDs to a data stream dependent on the type of data stream to be processed. In principle, the issuing of stream IDs is performed in a "content aware" manner taking into account the content of the data stream to be processed.

Such measure has the main advantage, that, if necessary, depending on the type of data stream, a stream ID can always be reserved to be available for a particular data stream of importance. A situation in which a data stream of high priority with regard to real-time requirements cannot be processed, as no stream ID is available, cannot occur within the proposed inventive concept. The issue of stream IDs dependent on the type of data stream is the basis to ensure that a stream ID is always available for a data stream with high priority and/or tight time restrictions.

Such guarantee cannot be given on the basis of a concept known from prior art.

Continued developed configurations of the invention are outlined in the dependent claims.

With regard to the proposed method, it is advantageous to provide further steps of the method as follows:

Advantageously the type of data stream implies a ranking of the data stream with regard to real-time data processing requirements. A stream ID selected from the set of stream IDs advantageously is issued to the data stream dependent on the ranking of the data stream.

Most preferably, a logical stream ID, which is assigned to an available physical stream ID, is issued to a data stream of high priority ranking. Advantageously in this case data can be processed without any delay as, in fact, the assigned logical stream ID corresponds to an available physical stream ID In a preferred configuration, the type of data stream is selected from the group consisting of audio/video, best effort, error handling. Still more than three types of data streams may be available and further types of data streams may be distinguished.

Preferably, the ranking of the data stream is selected from the group consisting of: first priority for audio/video type, second priority for best effort type, third priority for error handling type.

Most advantageously, a first physical stream ID is reserved to be available and a first logical stream ID of the set is assigned to the first physical stream ID such that the first logical stream ID of the set can be issued to an audio/video type of data stream if necessary. Such a configuration guarantees that an audio/video type of data stream is processed in any case as a physical stream ID is always reserved to be available for processing regardless of the circumstances.

Also additionally or alternatively a second physical stream ID may be reserved to be available and a second logical stream ID of the set is assigned to the second physical stream ID, such that the second logical stream ID of the set can be issued to a best effort type of data stream if necessary. Best effort type of data is to be processed such that errors have to be solved for maximum data reliability but also time requirements are still to be met.

In particular a third physical stream ID is not reserved, i.e. freely available, and a third logical stream ID of the set is assigned to the third physical stream ID, such that the third logical stream ID of the set can be issued dynamically to an error handling type of data stream. This may be achieved also for one or more third stream IDs. Therefore, advantageously dynamical issuing of stream IDs is performed. Any physical stream ID which is available may be assigned to a logical stream ID of the set on demand, and in a specific way, as necessary for the particular requirements of the specific situation.

In a further improvement, one or more of the third logical stream IDs of the set are applied to handle multiple errors simultaneously in a time-sliced manner.

Advantageously a number of data streams of the audio/video type and/or best effort type are collected and a single logical stream ID of the set is issued to the collection.

With regard to the proposed data processing module it is in particular advantageous to further provide the following features.

As already noted, the type of data stream may imply a ranking thereof and stream IDs may be issued dependent on the ranking. In particular, the module may comprise a scheduler means for preferably issuing a stream ID, which is assigned to an available physical stream ID, to a data stream of high priority ranking.

The module may comprise also a file system layer and a device layer for receiving the indication of the type of data stream and for handling the set of stream IDs.

Further, the invention leads to a data processing system, comprising a module of the proposed kind, wherein in accordance with the invention an application layer is comprised on top of the module layer. Further a device layer is comprised on below of the module layer. The module layer is capable of processing the data stream between the application layer and the device layer. In particular, such application may be an audio/video application. Most preferably the device layer may comprise a data storage medium like a hard disk drive or the like.

Also the invention leads to a computer program product storable on a medium readable by a computer system, comprising a software code section, which induces the computer system to execute the method as claimed in anyone of the preceding method claims, when the product is executed on the computer system. In particular, such a computer program product may comprise a software code section coded according to the proposed data processing module.

Also the invention leads to a data storage system comprising a device layer containing a feature set adapted for the processing of a data stream with regard to real-time data processing requirements and adapted for the handling of a set of stream IDs in the feature set, the set of stream IDs comprising a number of logical stream IDs, wherein a logical stream ID is assignable to a physical stream ID and wherein the number of logical stream IDs exceeds the number of physical stream IDs, wherein a logical stream ID can be issued to the data stream dependent on the type of data stream.

In particular, such a device may be any type of storage device capable of storing and handling a data stream with regard to real-time requirements in a suitable device layer like an IDE driver.

Also the invention leads to a method of use of a data processing module as proposed, a data processing system as proposed, a computer program product as proposed or a data storage system as proposed for an audio-video application, in particular in an audio-video server. Advantageously such an application may be any product containing a hard disk drive using an ATA AV feature set, for real-time audio-video streaming applications. Such a product may be e.g. a PC, a set top box, a television, a DVD/HDD combination, a digital VCR or a portable audio-video device.

Preferred embodiments of the invention will now be described in a detailed description with reference to the accompanying drawing. The drawing is meant to show examples to clarify the inventive concept in connection with the detailed description of a preferred embodiment and in comparison to prior art. The detailed description will illustrate what is considered as a preferred embodiment of the invention. It should of course be understood that various modifications and changes in form or in detail could readily be made without departing from the spirit of the invention. It is therefore intended that the invention may not be delimited to the exact form and detail shown and described herein nor to anything less than the whole of the invention disclosed herein and as claimed hereinafter. Further, the features described in the description, the drawings and the claims disclosing the invention, may be essential for the invention, considered alone or in combination.

The drawing shows in:

FIG. 1 a scheme of a data processing system, comprising a dynamic concept for issuing stream IDs, wherein a software layer of a data processing module is provided for dynamically issuing stream IDs, FIG. 2 a table indicating an exemplifying state of distribution when issuing stream IDs within a hard disk drive scheduler.

FIG. 1 shows a preferred embodiment of a layered architecture of a data processing system with an application layer 1 that uses a preferred embodiment of a data processing module 2 to access a hard disk drive 4 via an IDE driver 3. The preferred embodiment of the data processing module 2 may for instance be a real-time file system for communication with an application layer 1. Such a module 2 comprises a non-real-time communication path where non-real-time data 5 are processed by a file system layer 6 and are communicated to a hard disk drive scheduler 7.

According to a preferred embodiment, the file system layer 6 is also capable of processing real-time data 8. In a particularly advantageous modification, such real-time data may comprise types of data as described in the introduction, such as a first part of data referred to as streaming data 9 and further data 10 which are susceptible to error handling, such as for instance data 10. Also the streaming data 9 may be divided. Streaming data may comprise audio/video data 11, which are practically insusceptible to any kind of error handling so at best the error handling time should be negligible at best. Also best effort type data 12 may be comprised. These should be handled with best effort and with regard to real-time and data integrity requirements. Therefore, the real-time data in the preferred embodiment are subdivided into three kinds of data: data 11 of the audio/video type, data 12 of the best effort type and data 10 of the error handling type. The type of data implies a ranking of the data stream with regard to real-time data processing requirements. As audio/video type of data 11 substantially allows no delay or error handling, it is assigned the highest priority. Best effort type of data 12 still has high priority. Error handling type of data 10 is of somewhat lower priority with regard to real-time requirements as compared to audio/video type of data 11 and best effort type of data 12.

The set of stream IDs is handled in the file system 2 and a stream ID scheduler 13 according to the preferred embodiment if this embodiment is provided with the hard disk drive scheduler 7. The stream ID scheduler is arranged to issue a logical stream ID from the set of stream IDs to the data stream dependent on the type and preferably the ranking of the data stream. A stream ID, which is assigned to an available physical stream ID, is preferably issued to a data stream of high priority ranking. Such a scheme is outlined in FIG. 2 which will be described below. For further processing, the stream IDs are handled in a feature set 14 of an IDE driver.

Each of the types of data is coded by a specific marker. The audio/video type of data 11 is marked by a marker M1, the best effort type of data is marked by a marker M2 and the error handling type of data is marked by a marker M3. As such markers indicate the content of the data stream, the data processing in the preferred embodiment is "content aware". It should be understood that also any other suitable distinction and subdivision of real-time data or streaming data may be constituted in such a way as to allow for best data processing in the sense of the proposed scheme. Also such subdivision of data may not be restricted only to the subdivision of real-time data but may also be extended to the non-real-time data 5 such as IT data.

As outlined in FIG. 2 in a preferred embodiment, the host provides a set of stream IDs comprising a number of stream IDs (0.11). Such a number of logical stream IDs is not restricted to the further number of physical stream IDs. The number of logical stream IDs may be equal to the further number of physical stream IDs but advantageously in a preferred embodiment, the number of stream IDs exceeds the number of physical stream IDs. Some standards may intend to define a standard interface or at least a standard common register for stream IDs. These are possibly restricted to any size. In particular, such standardization limits the available number of physical stream IDs to the amount of 8 stream IDs. In the preferred embodiment of the proposed concept however a larger number of stream IDs is provided. As shown in FIG. 2, in addition to the number of physical stream IDs of eight, a number of four virtual stream IDs is provided. Therefore, a total number of twelve stream IDs within the set of stream IDs is provided. It should be understood that any other number of stream IDs may also be achieved if appropriate within the proposed concept.

With regard to FIG. 2, the preferred embodiment shows up to twelve logical stream IDs within a set of stream IDs. This basically results in twelve stream IDs, which may be busy (ID busy) at the same time. However the number of valid stream IDs (ID valid) is restricted to eight as only eight physical stream IDs (PID) are available due to restrictions of a standard or other system requirements. To guarantee that an audio-video data stream is handled properly within time requirements, one of the physical stream IDs is reserved (ID Mark) to be available and a particular logical stream ID of the set is assigned to the available physical stream ID. This is the case for the stream ID numbered "0". The particular stream ID "0" of the set is thereby issued to an audio-video type of data stream and the audio-video type of data stream is processed in any case. The audio-video type of data stream is processed even in the case of the rest of the system being blocked when no further physical stream IDs are available for instance for error handling or such like. The same holds for a best effort type of data stream like an audio-video type of data stream, which is outlined with FIG. 2. In this case also a physical stream ID is reserved. The logical stream ID numbered "1" of the set is valid in any case for data processing of stream data of the best effort type. Such data may be PC data or such like. Errors have to be solved in this case for maximum data reliability. However, the remaining stream IDs are not reserved, i.e. they are freely available to be dynamically issued and to handle multiple errors simultaneously in a time-sliced manner if so required.

In summary, within recent years, a standard, known as ATA-standard has been established to specify the AT attachment interface for disk drives. This standard defines an integrated bus interface between disk drives and host processors.

It provides a common point of attachment for systems manufacturers, systems integrators and suppliers of intelligent peripherals. In particular, it maintains a high level of compatibility with the AT attachment interface with extension standards, while providing additional functions it is not intended to require changes to presently installed devices or existing software. This standard in particular will incorporate a feature set for AV streaming applications. Within this feature set individual data streams may be given a stream ID. Such stream IDs are more or less used as error IDs. For instance they may be used within a time-sliced error management concept. There are also only a limited number of stream IDs available, in particular only eight stream IDs. A problem arises with more than eight streams, for a server serving multiple displays or error handling procedures exceeding the number of eight for instance. When the system is out of stream IDs, other data will be blocked and will cause severe degradation of processing performance.

It is proposed to dynamically distribute available stream IDs. The proposed concept provides for indicating a type of data stream, providing and/or handling a set of stream IDs comprising a number of logical stream IDs and issuing a logical stream ID from the set of stream IDs to the data stream depending on the type of data stream.

In a preferred embodiment, it is proposed to reserve a physical stream ID for an audio-video request, characterized by having no error handling time available. A further physical stream ID may be reserved for best effort requests. Still further stream IDs may not be reserved but are freely available for pending error handling procedures, such as time-sliced error handling procedures.

The invention claimed is:

1. A method of processing data of at least one data stream, the method comprising the steps of:
   indicating a type of data stream with regard to requirements of real-time data processing;
   providing and/or handling a set of stream IDs comprising a number of logical stream IDs, wherein each logical stream ID is assignable to a physical stream ID and is further assignable to a data stream, and wherein the number of logical stream IDs exceeds a number of physical stream IDs; and
   assigning one of the logical stream IDs to the data stream dependent on the type of data stream, wherein a logical stream ID is always available for a data stream with high priority with regard to real-time requirements.

2. The method as claimed in claim 1, wherein the type of data stream implies a ranking of the data stream with regard to real-time data processing requirements and the logical stream ID from the set of stream IDs is assigned to the data stream dependent on the ranking of the data stream.

3. The method as claimed in claim 1, wherein the logical stream ID, which is assigned to an available physical stream ID, is assigned to a data stream of a high priority ranking.

4. The method as claimed in claim 1, wherein at least three types of data streams are available, including audio/video type data streams, best effort type data streams and error handling type data streams.

5. The method as claimed in claim 4, wherein a ranking of the data stream is first priority for audio/video type data streams, second priority for best effort type data streams, third priority for error handling type data streams.

6. The method as claimed in claim 1, wherein a first physical stream ID is reserved to be available and a first logical stream ID of the set of stream IDs is assigned to the first physical stream ID such that the first logical stream ID of the set of stream IDs can be assigned to an audio/video type data stream.

7. The method as claimed in claim 1, wherein a second physical stream ID is reserved to be available and a second logical stream ID of the set of stream IDs is assigned to the second physical stream ID, such that the second logical stream ID of the set of stream IDs is assigned to a best effort type data stream.

8. The method as claimed in claim 1, wherein one or more third physical stream IDs are freely available and one or more third logical stream IDs of the set of stream IDs can each be assigned to each of the one or more third physical stream IDs, such that one or more third logical stream IDs of the set of stream IDs can be is assigned dynamically to an error handling type data stream.

9. The method as claimed in claim 8, wherein the one or more of the third logical stream IDs of the set of stream IDs are applied to handle multiple errors simultaneously in a time-sliced manner.

10. The method as claimed in claim 1, wherein a number of audio/video type data streams and/or best effort type data streams are collected and a single logical stream ID of the set of stream IDs is assigned to the collection.

11. A non-transitory computer-readable storage medium having stored thereon a data processing module for processing data of at least one data stream, the module having:
    a software layer in which a scheduler means is provided for:
    receiving an indication of a type of data stream with regard to real-time data processing requirements,
    handling a set of stream IDs comprising a number of logical stream IDs, wherein each logical stream ID is assignable to a physical stream ID and is further assignable to a data stream, and wherein the number of logical stream IDs exceeds a number of physical stream IDs, and
    assigning one of the logical stream IDs to the data stream dependent on the type of data stream, wherein a logical stream ID is always available for a data stream with high priority with regard to real-time requirements.

12. The non-transitory computer-readable storage medium as claimed in claim 11, wherein the type of data stream implies a ranking of the data stream with regard to real-time data processing requirements and a logical stream ID from the set of stream IDs is assigned to the data stream dependent on the ranking of the data stream.

13. The non-transitory computer-readable storage medium as claimed in claim 11, wherein the data processing module comprises the scheduler means for assigning a logical stream ID, which is assigned to an available physical stream ID, to a data stream of high priority ranking.

14. The non-transitory computer-readable storage medium as claimed in claim 11, wherein the data processing module further comprises a file system layer for receiving an indication of the type of data stream, and handling the set of stream IDs.

15. A data processing system comprising the non-transitory computer-readable storage medium having the data processing module stored thereon as claimed in claim 11, wherein the data processing system further comprises an application layer on top of the data processing module layer, and a device layer below the data processing module layer, wherein the data processing module layer processes the data stream between the application layer and the device layer.

16. The data processing system as claimed in claim 15, wherein the data processing system further comprises coding means for providing a marker for indication of the type and/or indication of a ranking of the data stream.

17. The data processing system as claimed in claim 15, wherein the data processing system further comprises a host for providing the set of stream IDs to be handled by a feature set contained in the device layer.

18. The data processing system as claimed in claim 15, wherein the number of logical stream IDs of the set amounts to twelve and the number of physical stream IDs amounts to eight.

19. A non-transitory computer-readable storage medium having stored thereon a computer program comprising a software code section which, when loaded on and executed by a computer system, causes the computer system to execute the method as claimed in claim 1.

20. A data storage system comprising, stored on a non-transitory computer-readable storage medium: a device layer containing a feature set for processing a data stream with regard to real-time data processing requirements, and for handling a set of stream IDs in the feature set, the set of stream IDs comprising a number of logical stream IDs, wherein each logical stream ID is assignable to a physical stream ID and is further assignable to a data stream, wherein the number of logical stream IDs exceeds a number of physical stream IDs, wherein a logical stream ID is assigned to the data stream dependent on a type of data stream, and wherein a logical stream ID is always available for a data stream with high priority with regard to real-time requirements.

\* \* \* \* \*